2,870,152

PIPERAZINE DERIVATIVES AND THE PRODUCTION THEREOF

Ludwig Schusteritz, Moorrege, and Viktor Wolf, Hamburg, Germany, assignors to Nordmark-Werke Gesellschaft mit beschränkter Haftung, Hamburg, Germany No Drawing. Application July 17, 1957
Serial No. 672,368

Claims priority, application Germany July 26, 1956

8 Claims. (Cl. 260—268)

This present invention relates to piperazine derivatives, and the production thereof, and provides new piperazine derivatives of the following general formula

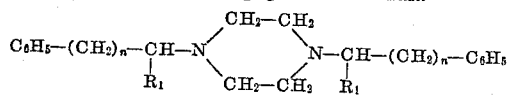

wherein the two $R_1$ substituents represent alkyl radicals with 1–8 carbon atoms and $n$ represents a whole number from 0 to 10, preferably a whole number from 0 to 6.

The invention also provides the salts of the aforementioned piperazine derivatives with acids which can be used therapeutically.

Piperazine derivatives disubstituted in the 1- and 4-positions by alkyl radicals are already known. The piperazine compounds described in the literature are, however, either substituted in the 1- and 4-positions symmetrically by unbranched aralkyl radicals, as is the case for example with the 1,4-dibenzyl piperazine (C. A. [1949] page 310), or substituted unsymmetrically by an aryl branched aralkyl radical and an unbranched aralkyl radical, as for example in the 1-(p-chlorobenzhydryl)-4-(m-methyl-benzyl)-piperazine (Swiss patent specification No. 299,879). In a physiological respect, is should be noted that these known piperazine compounds have preponderantly anti-histaminic and anti-spasmodic properties.

The new piperazine derivatives in accordance with the present invention are substituted in the 1- and 4-positions symmetrically by alkyl-branched aralkyl radicals: these derivatives, and also their salts with acids capable of being used therapeutically, have a pronounced action as medullary depressants, potentiators of narcosis and dilators of cortical vessels. These surprising properties were not to be expected and are valuable therapeutically.

The new derivatives and salts in accordance with the invention can be produced by methods which are usual for analogous but known compounds.

Thus, symmetrically substituted ethylene diamine derivatives of the general formula

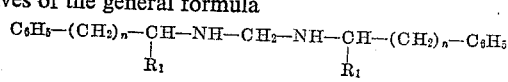

wherein $R_1$ and $n$ have the meanings indicated above, can be reacted with alkylene dihalides, such as for example ethylene dibromide or ethylene dichloride, in the presence of a condensing agent to give closure of the ring and formation of the piperazine derivatives. Alkali metal or alkaline earth metal hydroxides, carbonates or bicarbonates, also primary, secondary and tertiary organic bases, are suitable as condensing agents. The new compounds in accordance with the invention can also be obtained by reacting piperazine with an aralkyl halide of the general formula

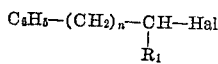

wherein Hal represents a halogen atom and $R_1$ and $n$ have the meanings already indicated, in the presence of a metal hydroxide, carbonate or bicarbonate or of an organic base. Piperazine itself can however also be used as condensing agent by using an excess thereof for the reaction with the aralkyl halide. It is also possible for piperazine, in admixture with a ketone of the general formula

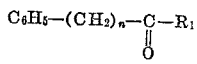

wherein $R_1$ and $n$ have the meanings indicated above, to be catalytically hydrogenated with hydrogen at elevated pressure and temperatures from 60 to 180° C. A Raney nickel or Raney cobalt catalyst, or a noble metal catalyst, is suitable. The new piperazine derivatives can also be obtained directly from a primary amine of the general formula

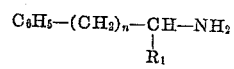

wherein $R_1$ and $n$ have the meanings indicated above, by heating the amine with an alkylene dihalide to a temperature from 160 to 180° C.

The new piperazine compounds can be obtained in a particularly advantageous manner from the primary amines of the constitution described above and from alkylene dihalides by carrying out the reaction in aqueous solution or in the presence of an organic solvent with the use of metal hydroxides, carbonates or bicarbonates as acid binding agents, it being immaterial in what sequence the three reactants are caused to react; they can even be reacted simultaneously.

The new piperazines, which are disubstituted in the 1- and 4-positions by secondary aralkyl radicals, are light-coloured oils which can be distilled in vacuo at 1 mm. Hg, usually without decomposition. With acids which can be used therapeutically, such as the hydrohalic acids, sulphuric acid, nitric acid or organic acids such as formic acid and acetic acid, these oils form well-crystallised salts.

Owing to the presence of two asymmetrical carbon atoms, the new piperazines can occur in isomeric forms. It has been found that the reaction of primary amines with alkylene dihalides in the presence of alkali metal carbonates gives the racemic compounds when the temperature is not higher than 110° C. The meso compounds are, however, obtained from primary amines, alkylene dihalide and alkali metal hydroxide at temperatures above 130° C. The racemate and meso compound can easily be separated by way of their hydrobromide salts. The racemate hydrobromide is readily soluble in hot methanol, while the meso hydrobromide is insoluble in hot methanol.

The new piperazine compounds have properties which are of great therapeutic value and can be used as medicines. Pharmacological investigation showed that these compounds used on an animal developed strong medullary depressing and narcosis potentiating effects. The strong and lasting effect in dilating cortical vessels is particularly advantageous, these compounds thus constituting valuable therapeutics for the treatment of obstructions in the cortical blood circulation.

The invention is further explained by the following examples:

*Example 1*

A solution of 58 g. of NaOH in 150 ccm. of water is added to 196.5 g. of phenyl isopropylamine and the mixture heated to 60° C. 137 g. of ethylene bromide are added dropwise thereto while stirring over a period of 30 minutes and the resulting mixture is then kept for 10 hours at 100–110° C.

The oily reaction product is submitted to extraction by shaking with methylene chloride, the methylene chloride solution is dried and the solvent is distilled off. The oily residue is freed from phenyl isopropylamine by distilling off the amine in vacuo.

37 g. of ethylene bromide are added dropwise over a period of 30 minutes to the distillation residue which remains, this addition taking place while stirring and at a temperature of 90–100° C. The hot bath liquid is kept at 100° C. for another half an hour. During this time, a vigorous reaction generally starts suddenly, the temperature rising suddenly to about 140° C. This reaction is then completed by heating for 13 hours at 130–140° C.

The oily reaction product is submitted to extraction with methylene chloride. The residue remaining after the methylene chloride has been driven off from the extract is taken up in 425 ccm. of methanol and 50 ccm. of aqueous hydrobromic acid (33%) is added thereto. The precipitate formed is filtered off with suction and thereafter submitted to extraction by boiling with 300 ccm. of 70% methanol. Most of the precipitate remains undissolved: this material is dissolved in and recrystallised from water and the di-(α-methyl-phenethyl)-piperazine dihydrobromide is obtained as a crystalline white powder with a melting point above 320° C.

Example 2

A mixture of 34 g. of phenyl isopropylamine and 47 g. of ethylene bromide is heated in an oil bath for 1 hour at 160° C. and then for another 8 hours at 180° C. The dark-coloured reaction product obtained is dissolved in 250 ccm. of water, the solution is made alkaline with sodium hydroxide solution, and the oil which separates out is submitted to extraction by shaking with methylene chloride. After the methylene chloride solution has been dried and the solvent has been driven off, the residue is taken up in methanol and neutralised with 33% hydrobromic acid. The white precipitate formed is filtered with strong suction, submitted to extraction by boiling it two or three times with methanol, and finally dissolved in and recrystallised from water. Di-(α-methyl-phenethyl)-piperazine dihydrobromide is obtained as a white crystalline powder which does not have any characteristic melting point, but gradually decomposes at a temperature above 320° C.

Example 3

Half of a solution of 80 g. of NaOH in 200 ccm. of water is added to a mixture of 229 g. of di(α-methyl-phenethyl)-ethylene diamine dihydrobromide and 94 g. of ethylene dibromide and stirred for half an hour at room temperature. The mixture is then heated to 60° C. and the remainder of the sodium hydroxide solution is slowly added dropwise while stirring. The complete mixture is then heated for 14 hours at 130–140° C.

The reaction product is submitted to extraction with methylene chloride and the residue remaining after the solvent has been driven off is subjected to high vacuum distillation. The fraction distilling over at a temperature between 160 and 210° C. at a pressure of 0.001–0.002 mm. Hg is taken up in methanol and the resulting liquid neutralised with 33% hydrobromic acid. The white crystalline precipitate formed is submitted to extraction by boiling with 70% methanol and the fraction which has remained insoluble is dissolved in and recrystallised from water. In this way, a good yield of di(α-methyl-phenethyl)-piperazine dihydrobromide is obtained. M.P.: higher than 320° C.

The dihydrochloride compound melts at 296–297° C.

Example 4

75 g. of ethylene bromide are slowly added dropwise and while stirring to a mixture of 59.6 g. of phenyl isobutylamine, 32 g. of NaOH and 80 ccm. of water at a temperature of 80–90° C. The temperature is now gradually raised, a vigorous reaction taking place for a brief time at about 100° C. Finally, the complete mixture is heated for 15 hours with an oil temperature of 130–140° C.

After cooling, the reaction product is submitted to extraction by shaking it twice with methylene chloride, using 50 ccm. thereof on each occasion, the methylene chloride solution is dried with sodium sulphate and finally the solvent is distilled off. The residue remaining is subjected to fractional distillation in vacuo, the fraction with a boiling range of 160–210° C. being separately collected at a pressure of 0.001–0.003 mm. Hg.

The light yellow oil which is obtained is taken up in 180 ccm. of methanol and 50 ccm. of 33% aqueous hydrobromic acid are added thereto. A white crystalline precipitate is formed which is filtered with strong suction. For further purification, this precipitate is submitted to extraction by boiling it twice with 70% methanol, usnig 200 ccm. thereof on each occasion. The residue which has remained undissolved is finally dissolved in and recrystallised from water, the di-(α-methyl-γ-phenyl-propyl)-piperazine dihydrobromide being obtained as a white crystalline powder with a melting point of 312–314° C.

Example 5

A mixture of 37 g. of α-phenyl ethyl bromide and 38.4 g. of piperazine hexahydrate is heated for 14 hours at 130 to 140° C. After cooling, the reaction product is dissociated in 250 ccm. of water with the addition of 2 N-NaOh until the reaction is strongly alkaline. The oil separating out is submitted to extraction by shaking with methylene chloride and is freed from the volatile constituents after drying the solution and driving off the methylene chloride at a pressure of 0.005–0.006 mg. Hg. The distillation residue, which becomes solid, is thereafter dissolved in 130 ccm. of boiling methanol, 16 ccm. of aqueous hydrobromic acid (33%) is added and the crystals which soon form are filtered off with suction while hot. The di-(α-methyl-benzyl)-piperazine dihydrobromide thus obtained can be dissolved in and recrystallised from water and forms a white powder with a melting point higher than 330° C.

Example 6

114 g. of ethylene bromide are added dropwise while stirring and over a period of 2½ hours to 107.5 g. of 1-phenyl-5-amino-hexane at 60° C. and thereafter the mixture is heated for another hour at 100° C. A solution of 46.8 g. of NaOH in 120 ccm. of water is then added over a period of 15 minutes and the mixture is heated while stirring for another 14 hours in an oil bath at 130–140° C. After cooling, the reaction product is submitted to extraction by shaking it several times with methylene chloride, the combined extracts are dried with Na₂SO₄ and the solvent is distilled off. The oily residue which remains is then distilled in vacuo, the oil distilling over between 182° and 215° C. at a pressure of 0.008 mm. Hg being collected separately.

This oil is then dissolved in 250 ccm. of methanol, and 33% aqueous HBr solution is added until the reaction is acid, whereupon a white salt precipitates in an abundant quantity. After being filtered off with strong suction, the salt is suspended twice in 200 ccm. of boiling methanol and another three times in boiling water for further purification purposes and is filtered while hot on each occasion. The white crystalline powder which has remained undissolved in methanol and water is the hydrobromide salt of N,N-di-[5-phenyl-1-methyl-pentyl-(1)]-piperazine; this salt melts at 279–280° C.

Example 7

82.7 g. of ethylene bromide are added dropwise over a period of 2 hours to 87.6 g. of α-phenyl-(n)-nonyl-amine at 60° C. The mixture is thereafter heated for 2 hours at 95–100° C., a solution of 51 g. of sodium carbonate in 250 ccm. of water is then added, and finally the complete mixture is heated for 15 hours while stirring at 95–100° C. After the reaction is complete, the reaction product is isolated with methylene chloride by shaking as has already been described, and N,N'-di-[α-(n)octyl-benzyl]-ethylene diamine is obtained as intermediate product, this being a yellow oil with the boiling point B. P. 0.01 mm. Hg=196–210° C.

25.6 g. of the ethylene diamine compound which is obtained are again heated with 11.4 g. of ethylene bromide for 1 hour at 95–100° C. A solution of 7.1 g. of $Na_2CO_3$ in 50 ccm. of water is then added and the mixture is kept for 15 hours at 100–105° C. while stirring.

After cooling, the oil which is formed is taken up in methylene chloride, dried with $Na_2SO_4$ and the solvent is distilled off.

From the oily residue which remains, the substance which is volatile up to B. P.=160° C. at a pressure of 0.005 mm. Hg is distilled off and the distillation residue is taken up in 50 ccm. of methanol. By adding aqueous HBr (33%) until the reaction is acid, the hydrobromide salt is precipitated and this salt can be dissolved in and recrystallised from butyl acetate after filtering with suction. In this way, N,N'-di-[α-(n)-octyl-benzyl]-piperazine dihydrobromide is obtained as a white crystalline powder with a melting point of 203.5 to 204.5° C.

For the treatment of human beings preferably hydrogen halide salts of the new piperazine derivatives are used. For injection purposes aqueous solutions of the said salts may be used. The said aqueous solutions may contain 0.5–3 parts by weight of the salts in question and 99.5–97 parts by weight of water. For the oral application the said salts may be used in the form of tablets. Preferably the tablets shall contain 25–100 mg. of the salt in question per tablet.

What we claim is:

1. A piperazine compound of the following general formula:

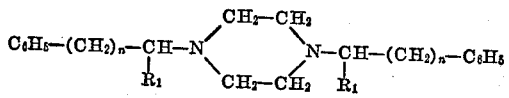

wherein the two $R_1$ substituents represent alkyl radicals with 1–8 carbon atoms and $n$ represents a whole number from 0 to 6, and salts of said piperazine compound.

2. Di-(α-methyl-phenethyl)-piperazine dihydrobromide.

3. Di-(α-methyl-γ-phenyl-propyl)-piperazine dihydrobromide.

4. Di-(α-methyl-benzyl)-piperazine dihydrobromide.

5. N,N'-di-[5-phenyl-1-methyl-pentyl-(1)]-piperazine dihydrobromide.

6. N,N'-di-[α-(n)-octyl-benzyl]-piperazine dihydrobromide.

7. The hydrochloride of a piperazine compound of the formula

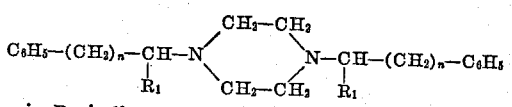

wherein $R_1$ indicates an alkyl radical with 1 to 8 carbon atoms, and $n$ represents an integer from 0 to 6.

8. The hydrobromide of a piperazine compound of the formula

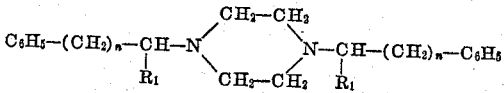

wherein $R_1$ indicats an alkyl radical with 1 to 8 carbon atoms, and $n$ represents an integer from 0 to 6.

References Cited in the file of this patent

UNITED STATES PATENTS

| 2,279,294 | Hardman | Apr. 14, 1942 |
| 2,343,834 | Scott | Mar. 7, 1944 |
| 2,414,018 | Carson | Jan. 7, 1947 |

OTHER REFERENCES

McElvain et al.: Jour. Amer. Chem. Soc., vol. 76, p. 1129 (1954).